(12) United States Patent
Shen

(10) Patent No.: US 6,805,327 B1
(45) Date of Patent: Oct. 19, 2004

(54) COMBINATION FOOT MEMBER

(75) Inventor: Tung-Lung Shen, Taipei (TW)

(73) Assignee: Tatung Co., Ltd., Taipei (TW)

( * ) Notice: Subject to any disclaimer, the term of this patent is extended or adjusted under 35 U.S.C. 154(b) by 0 days.

(21) Appl. No.: 10/730,072

(22) Filed: Dec. 9, 2003

(30) Foreign Application Priority Data

Oct. 7, 2003 (TW) ....................................... 92217942 U

(51) Int. Cl.⁷ .............................................. A47B 91/00
(52) U.S. Cl. ......................... 248/346; 248/918; 248/676
(58) Field of Search ................................ 248/676, 677, 248/678, 346.01, 917, 918

(56) References Cited

U.S. PATENT DOCUMENTS

| | | | | | |
|---|---|---|---|---|---|
| 4,638,744 A | * | 1/1987 | Clive-Smith | ............... | 108/56.1 |
| 4,874,099 A | * | 10/1989 | Arnott et al. | ................. | 211/50 |
| 5,020,768 A | * | 6/1991 | Hardt et al. | ................ | 248/678 |
| 5,040,766 A | * | 8/1991 | Egly et al. | .................. | 248/670 |
| 5,192,046 A | * | 3/1993 | Howard | ....................... | 248/676 |
| D338,882 S | * | 8/1993 | Reiter | ....................... | D14/447 |
| 5,263,668 A | * | 11/1993 | Reiter | .................... | 248/346.01 |
| 5,295,648 A | * | 3/1994 | Hames | ........................ | 248/149 |
| 5,774,332 A | * | 6/1998 | Ruch et al. | ................. | 361/686 |
| 6,059,384 A | * | 5/2000 | Ho | ........................... | 312/223.2 |
| 6,364,278 B1 | * | 4/2002 | Lin et al. | ..................... | 248/676 |
| 6,439,528 B1 | * | 8/2002 | Goto et al. | ............ | 248/346.01 |
| 6,497,013 B1 | * | 12/2002 | Goto et al. | ............ | 248/346.01 |

* cited by examiner

*Primary Examiner*—Leslie A. Braun
*Assistant Examiner*—Steven Marsh
(74) *Attorney, Agent, or Firm*—Bacon & Thomas PLLC

(57) ABSTRACT

A combination foot member is disclosed to include two parts that are assembled by inserting the guide board of one part of the foot member into the bottom receiving chamber of the other part of the foot member to let the L-shaped stop member at one part of the foot member stopped at the stop flange at the other part of the foot member for enabling the guide board of one part of the foot member to be respectively engaged into the bottom receiving chamber of the other part of the foot member. In case an excessive force is applied to foot member when adjusting the pitch between the parts, the respective L-shaped stop members will be stopped at the corresponding stop flanges, preventing falling of the parts from each other accidentally.

5 Claims, 7 Drawing Sheets

COMBINATION FOOT MEMBER

BACKGROUND OF THE INVENTION

1. Field of the Invention

The present invention relates to a foot member and, more particularly, to a combination foot member, which is practical for use to support the mainframe of an informative apparatus, for example, a computer system in vertical.

2. Description of Related Art

When informative apparatus are used in a house, the positioning of the mainframe of each informative apparatus has a great concern with the utilization of house space. For example, the mainframe of an early designed personal computer has a flat rectangular shape, and is to be positioned on the floor or a flat surface in horizontal. This horizontal positioning requires much installation space. Therefore, vertical computers are commonly used at the present time to replace early designed horizontal computers. When a vertical computer is used, it occupies less floor or table space.

When setting the mainframe of a personal computer in vertical, the center of gravity of the mainframe is shifted upwards, and the mainframe may fall to be floor easily when vibrated or hit by an external body. In order to support the mainframe of a personal computer on the floor in a vertical position stably, foot members may be used. FIG. 1 shows two foot members 92 put beneath the mainframe 91 of a vertical computer. As illustrated in FIG. 2, the foot member 92 is comprised of two parts coupled together and slidable relative to each other. Because this design of foot member has no stop means to stop disconnection of the parts from each other, the parts may be forced away from each other accidentally when the user adjusting the pitch, thereby causing the mainframe 91 to fall to the floor or to injure the user's body.

Therefore, it is desirable to provide a combination foot member that eliminates the aforesaid problem.

SUMMARY OF THE INVENTION

It is the main object of the present invention to provide a combination foot member, which has stop means that stops falling of the parts accidentally, preventing damage to the hardware or human body.

To achieve this and other objects of the present invention, the combination foot member comprises a first part and a second part coupled to each other. The first part and the second part each are comprised of a base and a sideboard. The base comprises a top wall, a first sidewall, a second sidewall opposite to the first sidewall, a bottom receiving chamber defined by the top wall, the first sidewall and the second sidewall, and a forwardly extended guide board suspended in the bottom receiving chamber near the first sidewall below the elevation of the top wall. The top wall has a front side terminating in a butt end near the second sidewall and a rear side provided with a coupling structure. The guide board has a L-shaped stop member downwardly extended from the front side thereof and an opening faced to the first sidewall. The second sidewall has a horizontal guide rail disposed at the inner surface and terminating in a downwardly extended stop flange. The sideboard is pivoted to the coupling structure of the base, and turnable to a vertical position perpendicular to the base. When coupling the first part and the second part to each other, the guide board of the base of one part of the foot member is respectively inserted slantwise into the bottom receiving chamber of the base of the other part of the foot member to force the respective L-shaped stop member to overstride the corresponding stop flange, and then the guide board of the base of one part of the foot member is respectively inserted straightly into the bottom receiving chamber of the base of the other part of the foot member for enabling the respective L-shaped stop member to slide forward along the corresponding horizontal guide rail. When the two parts of the foot member are assembled for use to support the mainframe of a computer in vertical, the user can move the parts of the foot member relative to each other to adjust the pitch between the sideboards. In case an excessive force is applied to the parts of the foot member to force the parts apart during pitch adjustment, the respective L-shaped stop members will be slid backward along the corresponding horizontal guide rail and stopped at the corresponding stop flanges, preventing falling of the parts from each other accidentally.

DETAILED DESCRIPTION OF THE PREFERRED EMBODIMENT

Figure 1:
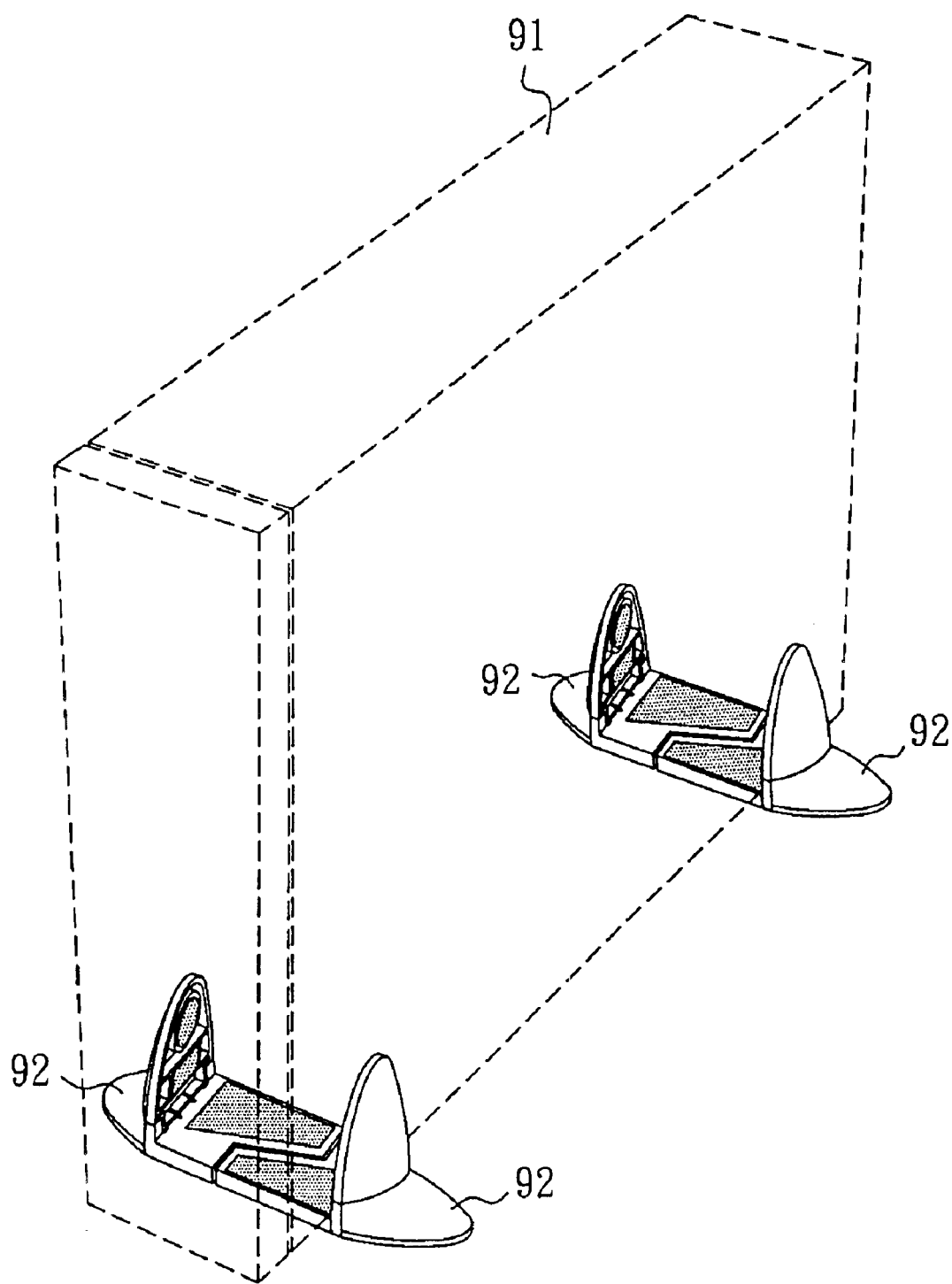
FIG. 1 is a schematic applied view of combination foot members according to the prior art.
Figure 2:
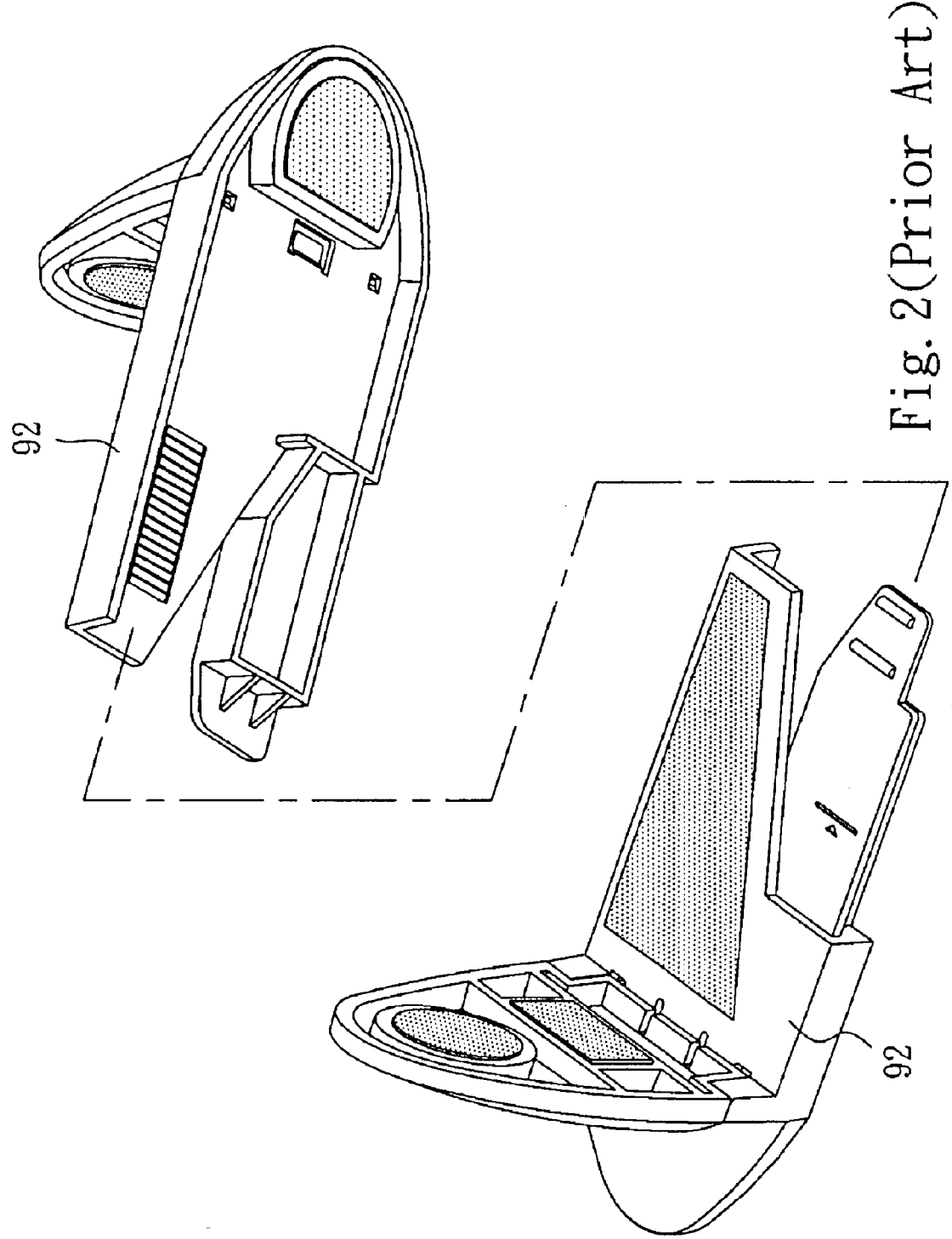
FIG. 2 is an exploded view of a combination foot member according to the prior art.
Figure 3:
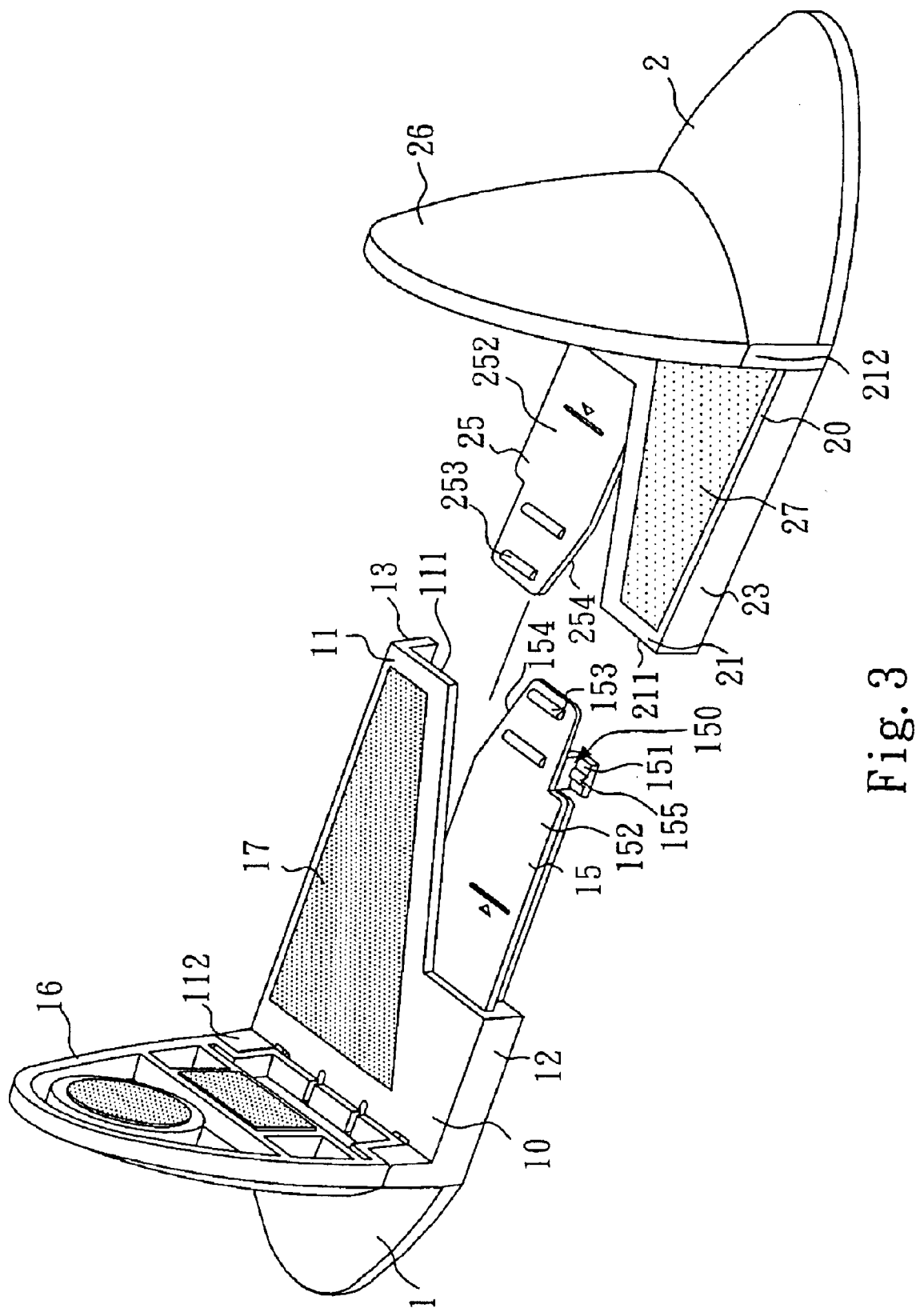
FIG. 3 is an oblique top exploded view of a combination foot member according to the present invention.
Figure 4:
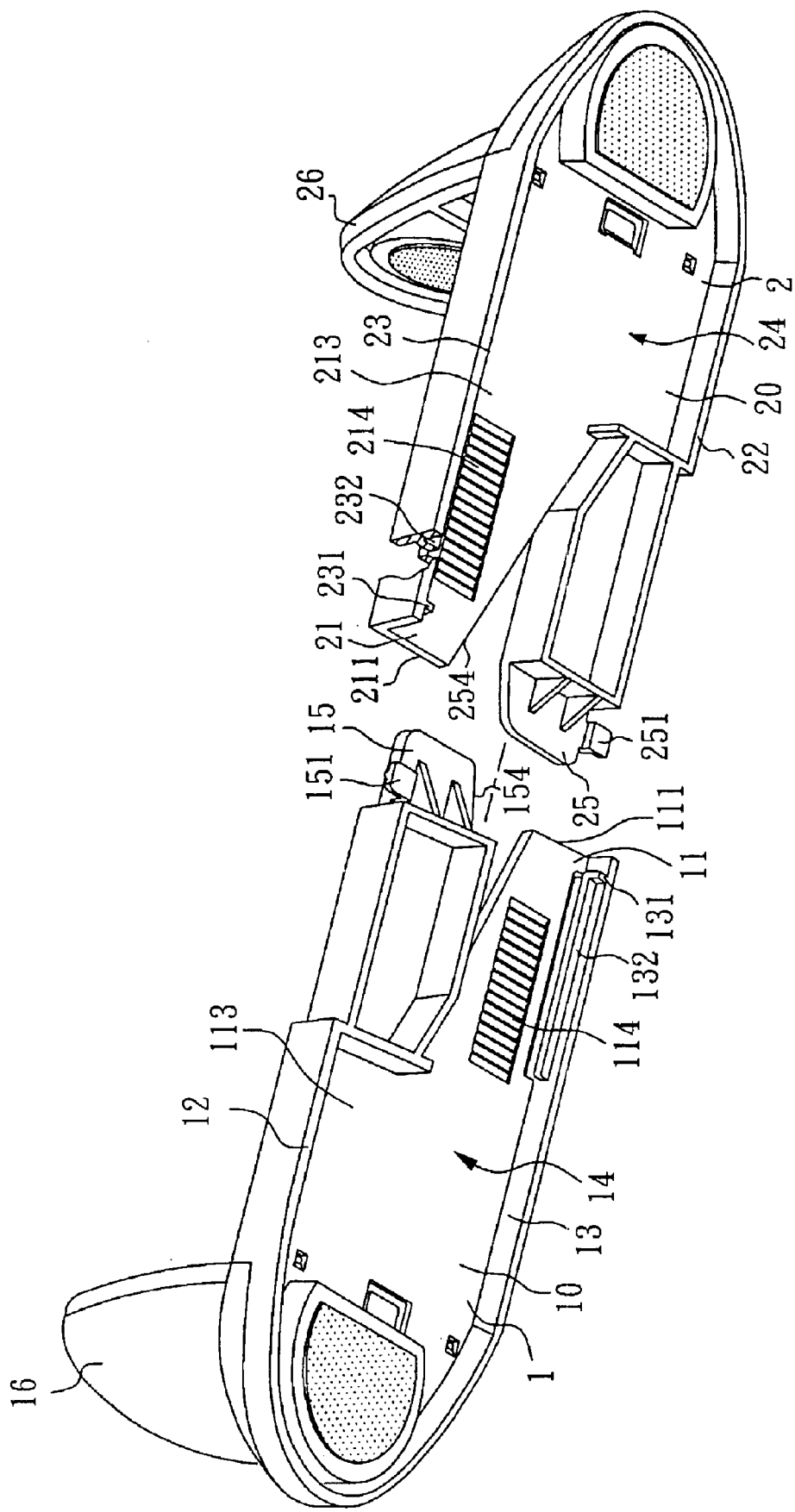
FIG. 4 is an oblique bottom view of FIG. 3.

Referring to FIGS. 3 and 4, a combination foot member in accordance with the present invention is shown comprised of a first part 1 and a second part 2. The first and second parts 1 and 2 each comprise a base 10 or 20 and a sideboard 16 or 26.

The base 10 or 20 comprises a top wall 11 or 21, a first sidewall 12 or 22, a second sidewall 13 or 23 opposite to the first sidewall 12 or 22, and a bottom receiving chamber 14 or 24 defined by the top wall 11 or 21, the first sidewall 12 or 22, and the second sidewall 13 or 23. The front side of the top wall 11 or 21 is a butt end 111 or 211 near the second sidewall 13 or 23. The rear side of the top wall 11 or 21 is provided with a coupling structure 112 or 212. A forwardly extended guide board 15 or 25 is suspended in the bottom receiving chamber 14 or 24 near the first sidewall 12 or 22 below the elevation of the top wall 11 or 21. The guide board 15 or 25 has a L-shaped stop member 151 or 251 downwardly extended from the front side thereof and an opening 150 faced to the first sidewall 12 or 22. The second sidewall 13 or 23 has a horizontal guide rail 132 or 232 disposed at an inner surface and terminating in a downwardly extended stop flange 131 or 231.

The top wall 11 or 21 has a bottom surface 113 or 213, and a plurality of grooves 114 or 214 at the bottom surface 113 or 213. The guide board 15 or 25 further has a top surface 152 or 252, a tooth 153 or 253 raised from the top surface 152 or 252, and a beveled front guide face 154 or 254. The L-shaped stop member 151 or 251 has a raised guide portion 155.

The sideboard 16 or 26 is pivoted to the coupling structure 112 or 212 of the base 10 or 20, and can be turned to a vertical position perpendicular to the base 10 or 20.

Figure 5:
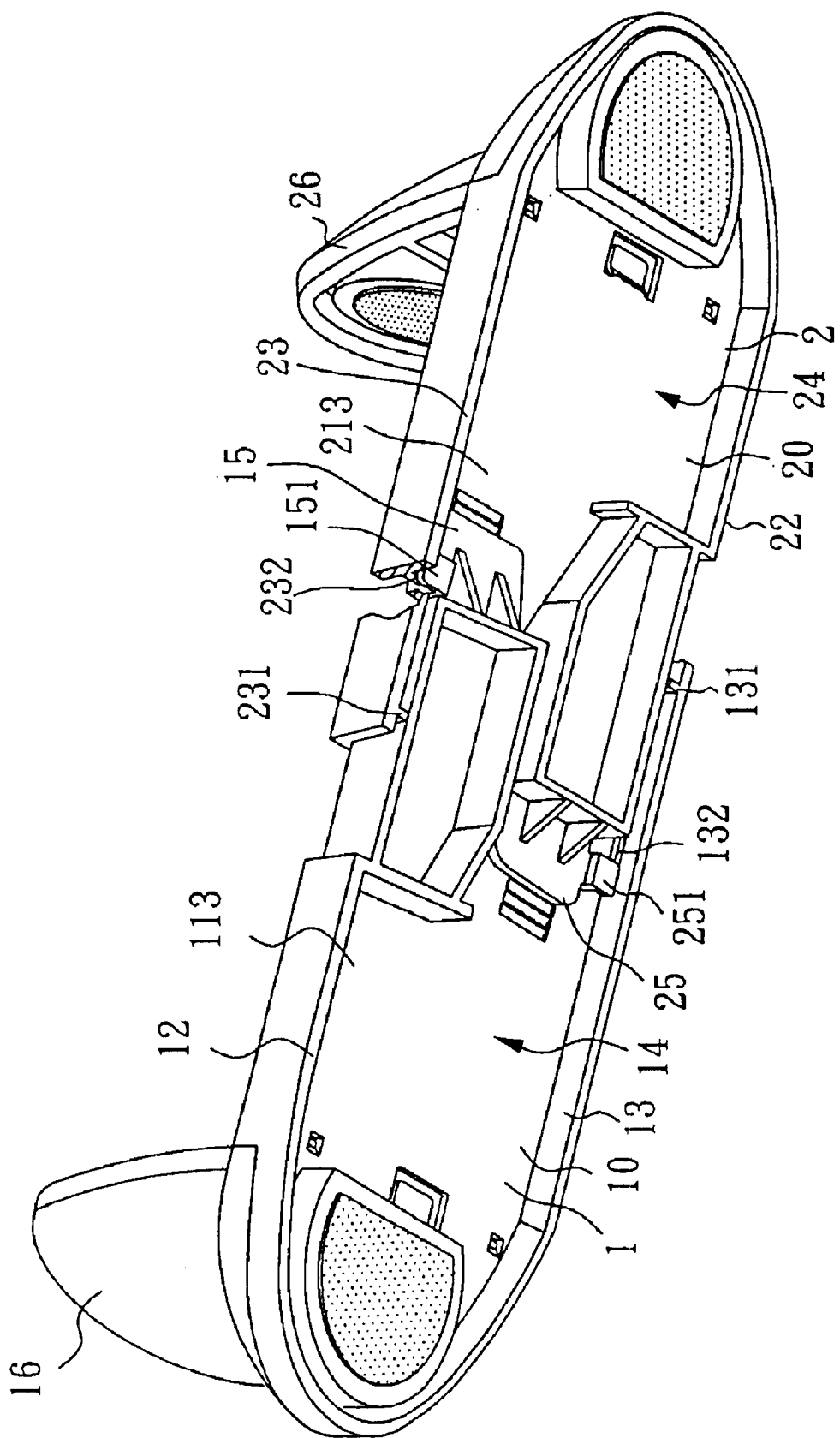
FIG. 5 is an oblique bottom view of the present invention, showing the two parts of the combination foot member coupled together.
Figure 6:
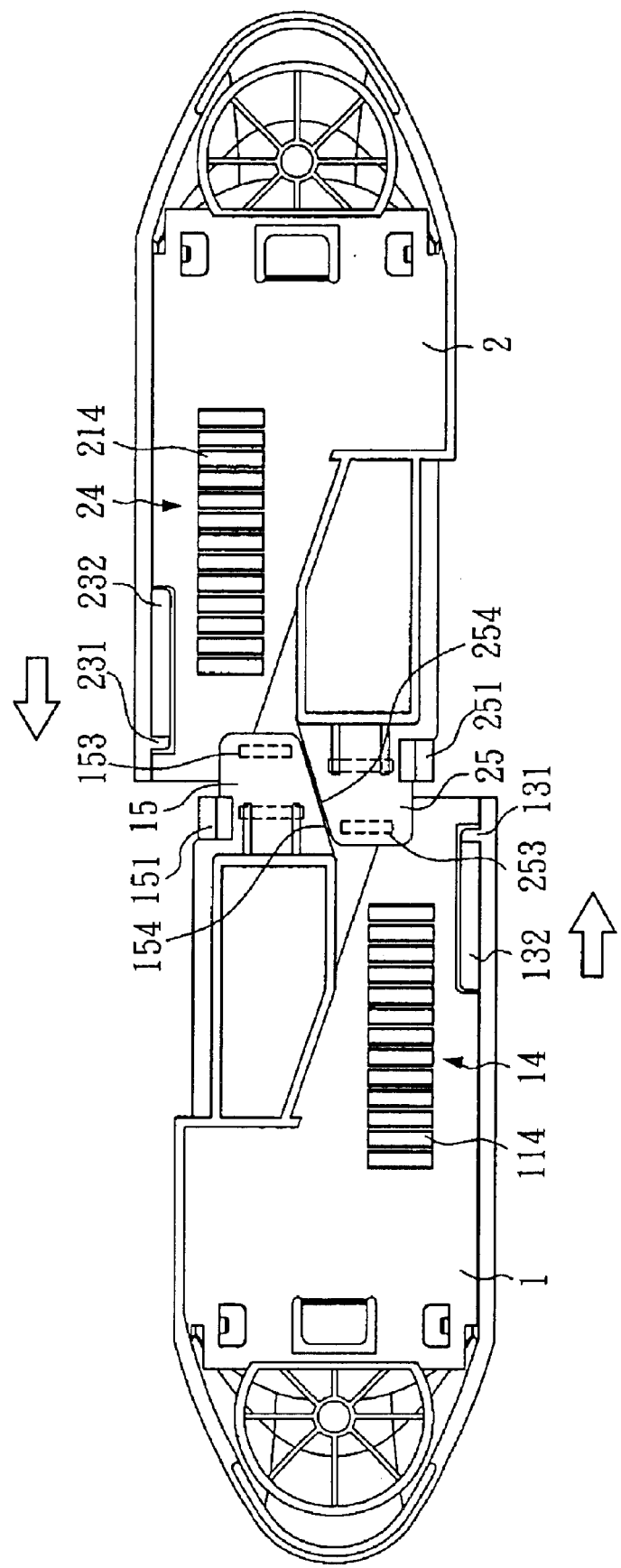
FIG. 6 is a bottom plain view of FIG. 5.
Figure 7:
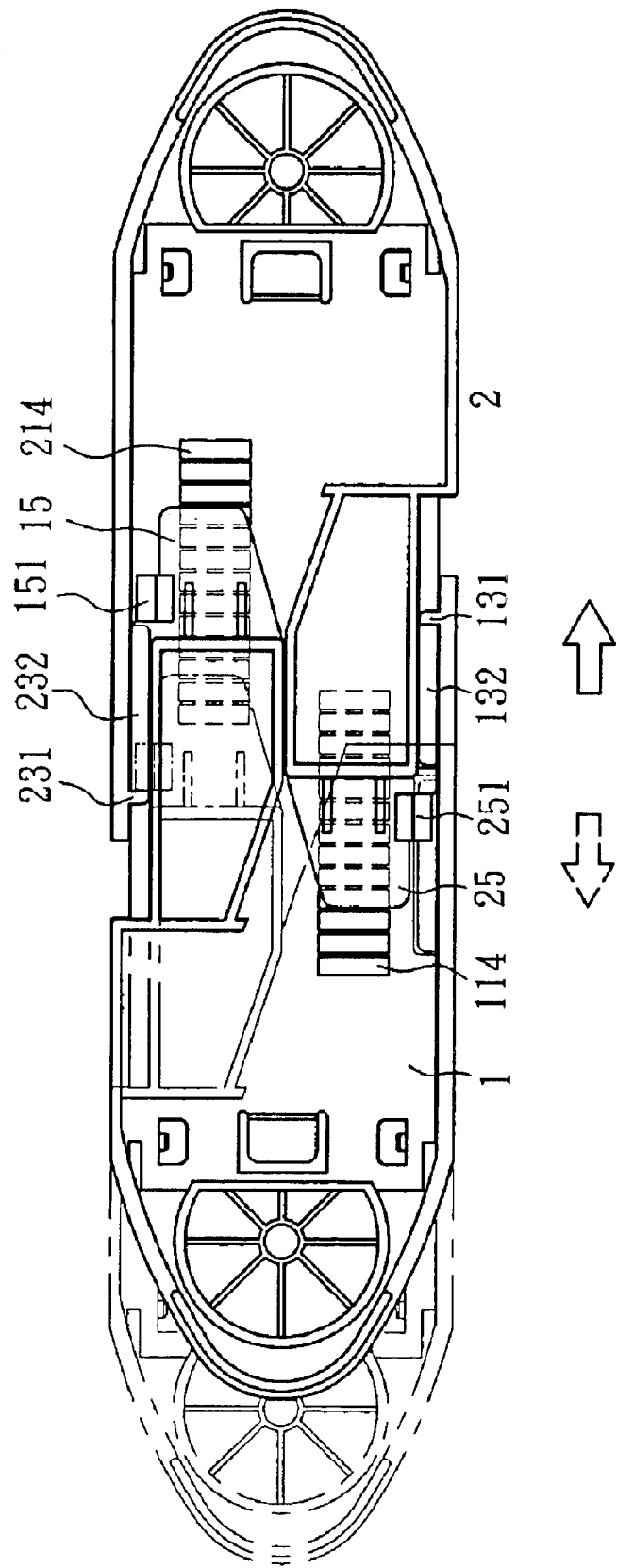
FIG. 7 is a schematic drawing of the present invention, showing the two parts of the combination foot member adjusted relative to each other.

Referring also to FIGS. 5~7, when wishing to use the combination foot member to support the mainframe of a computer in vertical, the first part 1 and the second part 2 must be assembled at first. At this time, attach the beveled front guide faces 154 and 254 of the guide boards 15 and 25 to each other, and then insert the guide boards 15 and 25 slantwise into the corresponding bottom receiving chambers 14 and 24 to force the L-shaped stop members 151 and 251 to overstride the corresponding stop flanges 131 and 231, and then for enabling the guide boards 15 and 25 to be respectively inserted straightly into the corresponding bottom receiving chambers 14 and 24. On the contrary, the bottom receiving chambers 14 and 24 are respectively faced to the corresponding guide boards 15 and 25 to slide L-shaped stop members 151 and 251 of the respective parts 1 and 2 forward along the corresponding horizontal guide rails 132 and 232. At this time, The raised guide portions 155 of the respective L-shaped stop members 151 and 251 are directly slid on the corresponding horizontal guide rails 132 and 232 (see FIG. 3). Thus, surface contact is changed to line contact, reducing friction resistance between the parts 1 and 2.

When the two parts 1 and 2 are assembled for use to support the mainframe of the computer in vertical, the user can move the parts 1 and 2 relative to each other to adjust the pitch between the sideboards 16 and 26. At this time, the L-shaped stop members 151 and 251 are respectively slid on the corresponding horizontal guide rails 132 and 232 to shift the engagement between the teeth 153 and 253 and the corresponding grooves 114 and 214. When adjusted, the combination foot member is put beneath the mainframe of the computer, keeping the sideboards 16 and 26 clamped on the two opposite side panels of the mainframe of the computer. According to this embodiment, the top wall 11 or 21 of the base 10 or 20 is covered with an anti-skid pad 17 or 27 that increases friction resistance between the combination foot member and the mainframe of the computer.

In case an excessive force is applied to the parts 1 and 2 to force the parts 1 and 2 apart during pitch adjustment, at this time, the L-shaped stop members 151 and 251 will be slid backward along the corresponding horizontal guide rails 132 and 232 and stopped at the corresponding stop flanges 131 and 231, preventing falling of the parts 1 and 2 from each other accidentally.

Although the present invention has been explained in relation to its preferred embodiment, it is to be understood that many other possible modifications and variations can be made without departing from the spirit and scope of the invention as hereinafter claimed.

What is claimed is:

1. A combination foot member comprising a first part and a second part coupled to each other, said first part and said second part each comprising:

a base, said base comprising a top wall, a first sidewall, a second sidewall opposite to said first sidewall, a bottom receiving chamber defined by said top wall, said first sidewall and said second sidewall, and a forwardly extended guide board suspended in said bottom receiving chamber near said first sidewall below the elevation of said top wall, said top wall having a front side terminating in a butt end near said second sidewall and a rear side provided with a coupling structure, said guide board having a L-shaped stop member downwardly extended from a front side thereof and an opening faced to said first sidewall, said second sidewall having a horizontal guide rail disposed at an inner surface thereof and terminating in a downwardly extended stop flange; and a sideboard pivoted to said coupling structure of said base and turnable to a vertical position perpendicular to said base;

wherein when coupling said first part and said second part to each other, the guide board of each of said first part and said second part is respectively inserted slantwise into the bottom receiving chamber of the other of said first part and said second part to force the respective L-shaped stop member to overstride the corresponding stop flange, and then the guide board of each of said first part and said second part is respectively inserted straightly into the bottom receiving chamber of the other of said first part and said second part for enabling the respective L-shaped stop member to slide forward along the corresponding horizontal guide rail;

wherein when separating said first part and said second part from each other, the respective L-shaped stop member slides backward along the corresponding horizontal guide rail and stops at the corresponding stop flange.

2. The combination foot member as claimed in claim 1, wherein the top wall of each of said first part and said second part has a bottom surface and a plurality of grooves at said bottom surface; the guide board of each of said first part and said second part has a top surface and at least one tooth raised from the top surface and adapted to selectively engage the grooves at the bottom surface of the other of said first part and said second part.

3. The combination foot member as claimed in claim 1, wherein the guide board of each of said first part and said second part has a beveled front guide face so arranged that when coupling said first part and said second part to each other, the beveled front guide face of the guide board of one of said first part and said second part is moved over the beveled front guide face of the guide board of the other of said first part and said second part to guide the respective guide boards slantwise into the corresponding bottom receiving chambers.

4. The combination foot member as claimed in claim 1, wherein the L-shaped stop member of each of said first part and said second part has a raised guide portion so arranged that when coupling said first part and said second part to each other, the raised guide portion of the L-shaped stop member of one of said first part and said second part is slid on the horizontal guide rail of the second sidewall of the other of said first part and said second part.

5. The combination foot member as claimed in claim 1, wherein said first part and said second part each further comprise an anti-skid pad covered on the top wall of the respective base.

* * * * *